(12) United States Patent
Burger et al.

(10) Patent No.: US 7,066,316 B2
(45) Date of Patent: Jun. 27, 2006

(54) DEVICE FOR TRANSPORTING CYLINDRICAL OBJECTS

(75) Inventors: Kurt Burger, Friolzheim (DE); Johannes Rauschnabel, Stuttgart (DE); Bernd Goetzelmann, Rot am See (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/522,950

(22) PCT Filed: Apr. 10, 2003

(86) PCT No.: PCT/DE03/01177

§ 371 (c)(1),
(2), (4) Date: Feb. 2, 2005

(87) PCT Pub. No.: WO2004/018330

PCT Pub. Date: Mar. 4, 2004

(65) Prior Publication Data
US 2005/0241913 A1    Nov. 3, 2005

(30) Foreign Application Priority Data
Aug. 2, 2002 (DE) ................................ 102 35 375

(51) Int. Cl.
*B65G 47/24* (2006.01)

(52) U.S. Cl. .................. 198/411; 198/400; 198/608

(58) Field of Classification Search ........... 198/400, 198/411, 412, 397.06, 457.02, 608, 611, 624, 198/385, 387
See application file for complete search history.

(56) References Cited

U.S. PATENT DOCUMENTS

| | | | | |
|---|---|---|---|---|
| 1,916,840 A | * | 7/1933 | Keller ..................... | 198/608 |
| 4,789,290 A | * | 12/1988 | Barnhart et al. ......... | 198/411 |
| 4,872,564 A | * | 10/1989 | van der Schoot ......... | 198/387 |

FOREIGN PATENT DOCUMENTS

| | | |
|---|---|---|
| AT | 374 158 | 3/1984 |
| DE | 502 510 | 7/1930 |
| DE | 508 229 | 10/1930 |
| DE | 1 448 689 | 8/1966 |
| DE | 24 30 633 | 1/1976 |
| DE | 25 58 041 | 6/1977 |
| DE | 32 39 541 A1 | 4/1984 |
| DE | 84 19 051 U1 | 9/1984 |
| DE | 33 30 019 A1 | 2/1985 |
| DE | 102 11 976 A1 | 10/2003 |
| GB | 2 096 558 A | 10/1982 |
| JP | 55-135077 | 10/1980 |
| JP | 60-262710 | 12/1985 |
| JP | 4-72209 | 3/1992 |
| JP | 10-87041 | 4/1998 |

* cited by examiner

*Primary Examiner*—James R. Bidwell
(74) *Attorney, Agent, or Firm*—Ronald E. Greigg

(57) ABSTRACT

An apparatus for transporting cylindrical objects, in particular containers, has at least two shafts that rotate in the same direction, axially perpendicular to the transporting direction of the objects. While being transported, the objects come to rest with their cylindrical wall on one shaft and with one face end on an adjacent shaft. By means of the axial spacing and/or the respective diameters of the shafts a predeterminable angular position of the objects to the plane of the axes of the shafts and an intrinsic rotation of the objects can be effected.

20 Claims, 2 Drawing Sheets

DEVICE FOR TRANSPORTING CYLINDRICAL OBJECTS

CROSS-REFERENCE TO RELATED APPLICATIONS

This application is a 35 USC 371 application of PCT/DE 03/01177 filed on Apr. 10, 2003.

BACKGROUND OF THE INVENTION

1. Field of the Invention

The invention relates to an apparatus for transporting cylindrical objects, in particular containers during a treatment process, such as a sterilization process.

2. Description of the Prior Art

In German Patent Disclosure DE 102 11 976.7, which had not yet been published by the priority date of the present application, an apparatus is described with which the containers while being transported rest in a sterile treatment chamber on an apparatus is movable in the transporting direction that comprises rollers, which are rotatable transversely to the transporting direction and between which the containers come to rest.

The containers, which by means of this apparatus are transported in the transporting direction and roll about a pivot axis transversely to the transporting direction, are guided such that at the infeed region, the containers can be rotated past a plasma source, for instance, which for the sake of sterilization is also known per se from European Patent Disclosure EP 0 377 788 A1. In the sterilization of these objects, the objects are completely exposed to a low-pressure plasma in the treatment chamber and at the same time can be transported linearly.

SUMMARY AND ADVANTAGE OF THE INVENTION

Advantageously, an apparatus for transporting cylindrical objects, in particular containers, is embodied such that at least two shafts rotating in the same direction, axially perpendicular to the transporting direction of the containers, are present. The transport apparatus may for instance be disposed in a treatment chamber with a plasma source for generating electromagnetic oscillations for sterilizing the containers.

In the apparatus of the invention, while the containers are being transported, they come to rest with their cylindrical wall on one shaft and with a face end on a respective adjacent shaft. By means of the axial spacing and/or the diameters of the respective shafts, it is advantageously possible according to the invention to achieve a predeterminable angular position of the objects or containers to the plane of the axes of the shafts and also to achieve an intrinsic rotation and a longitudinal motion of the containers as well under the influence of the respective speeds of rotation of the shafts. It is also advantageous here if the shafts are inclined at a predetermined angle to the transporting direction, so that the speed of the longitudinal motion is thus adjustable.

With a suitable calculation method or by experimentation, the axial spacing and/or the diameters of the respective shafts can be ascertained in a simple way and then selected, as a function of the geometric dimensions of the cylindrical objects or containers, by ascertaining the path of the center of gravity as a function of the angular position of the respective object or article. As geometric dimensions, in particular the diameter and the length of the particular object can be considered, optionally taking into account the change in center of gravity resulting from geometric designs of a bottle-like opening region of a container. Thus with simple adjustment possibilities, a wider range of container diameters and shapes can be handled.

With the invention, linear transporting of cylindrical containers, for instance in a sterile ambient area, is advantageously possible. The particular container is rotated uniformly about its own longitudinal axis, so that in the sterilization process, over the transport course, the entire cylindrical surface is accessible, and the rotating transporting means can likewise be sterilized on all sides. Moreover, according to the invention, it is also possible in a simple way to transport the containers, largely standing upright, in the filled state.

The disadvantages of complicated transporting systems, such as cellular belts for a cell mount with so-called clip systems, or systems without direct fixation, or conveyor belts, in which the containers stand next to one another and are guided laterally, are avoided here.

In summary, several essential advantages of the invention are attained. For instance, even if a container falls over, it will not break. Instead, the container can continue to be transported lying on its side and can be set back up again simply by means of baffles or other additional applications, such as a gripper. According to the invention, the container can also be transported in general lying on its side, with the restriction that filled containers cannot be transported that way, so that there is no danger of it falling over.

Because many adaptations and adjustments to the apparatus can be made from outside, adjustment by a tedious exchange of components is dispensed with. The shafts of the transport apparatus of the invention are a readily accessible surface for cleaning, sterilizing, or similar treatment methods.

Advantageously, a plurality of parallel transport paths with the appropriate shafts can also be realized in one treatment chamber. The transporting can furthermore be done with little energy input, because now only rolling friction occurs at the containers, with an extremely low coefficient of friction.

Besides being used for transporting into sterilization chambers, the apparatus of the invention can also be used to transport containers in shunts that precede and follow the sterilization chambers, and in buffers between individual stations in packaging lines, as well as for other purposes, such as for applying colored ring markings to containers, or for monitoring the contents or the material comprising the container itself on all sides using camera systems.

BRIEF DESCRIPTION OF THE DRAWINGS

One exemplary embodiment of a transport apparatus for sterilizing cylindrical containers is described herein below, in conjunction with the drawings, in which.

DESCRIPTION OF THE PREFERRED EMBODIMENT

Figure 3:
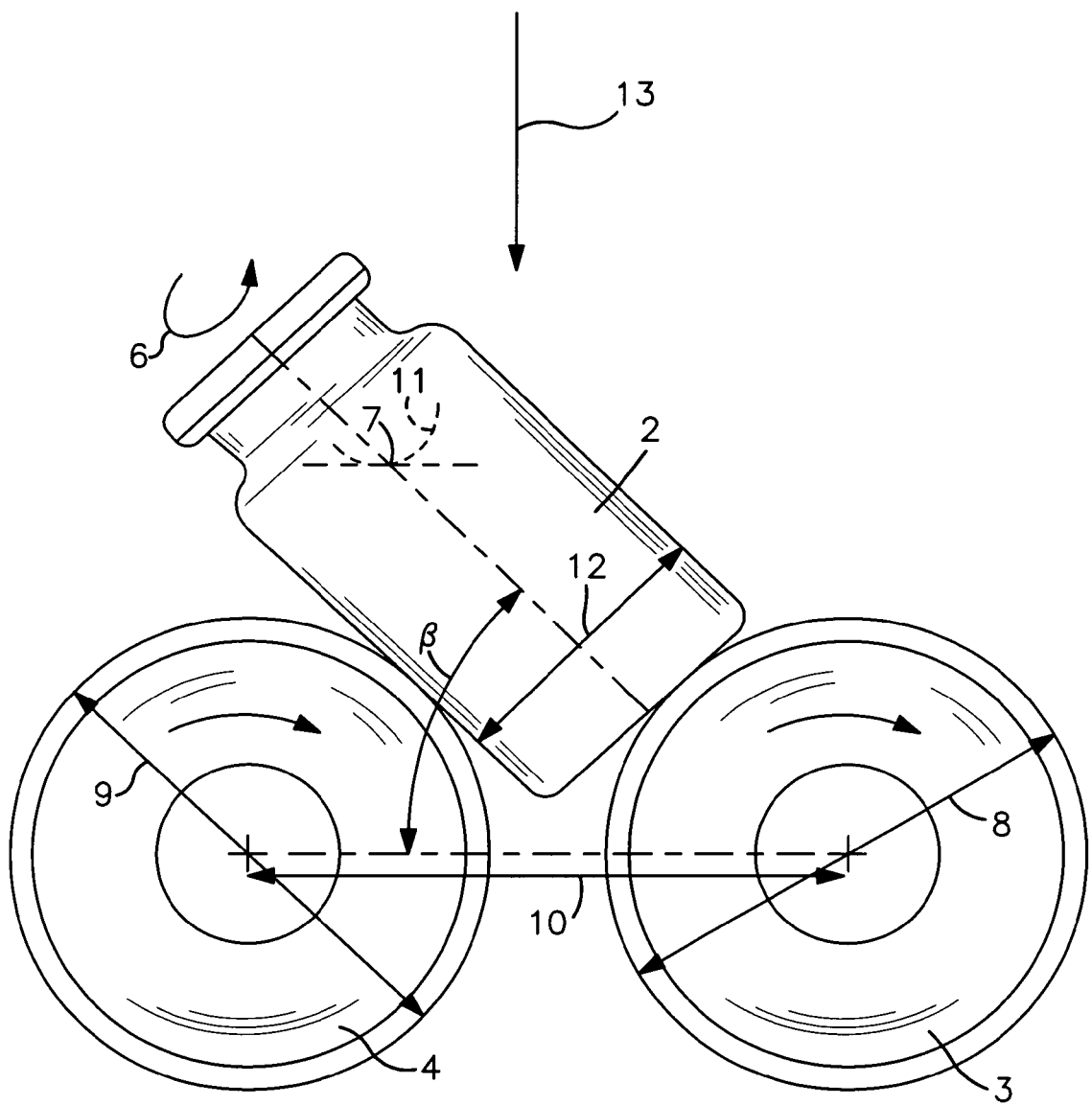
FIG. 3, a view of two shafts in section and a container transported at a predetermined angular position.

In the drawings an exemplary embodiment of an apparatus 1 for transporting containers 2 is shown, with which the containers 2 are transported, for instance via suitable shunts, throughout a treatment chamber, such as a sterilization chamber 20 (FIG. 3), not described further here. In this sterilization chamber (20), the containers can be exposed to a plasma, which is generated at a plasma source that is supplied for instance with high-frequency or microwave energy. The apparatus 1 has a number of rotatable shafts, of which here only the shafts 3 and 4 are identified, since between them the containers 2 are transported, as will be described in still further detail in conjunction with the other drawings. The spacings between the containers 2 may be adjusted by means of a worm gear 14 mounted on at least one shaft 3, 4.

Figure 1:
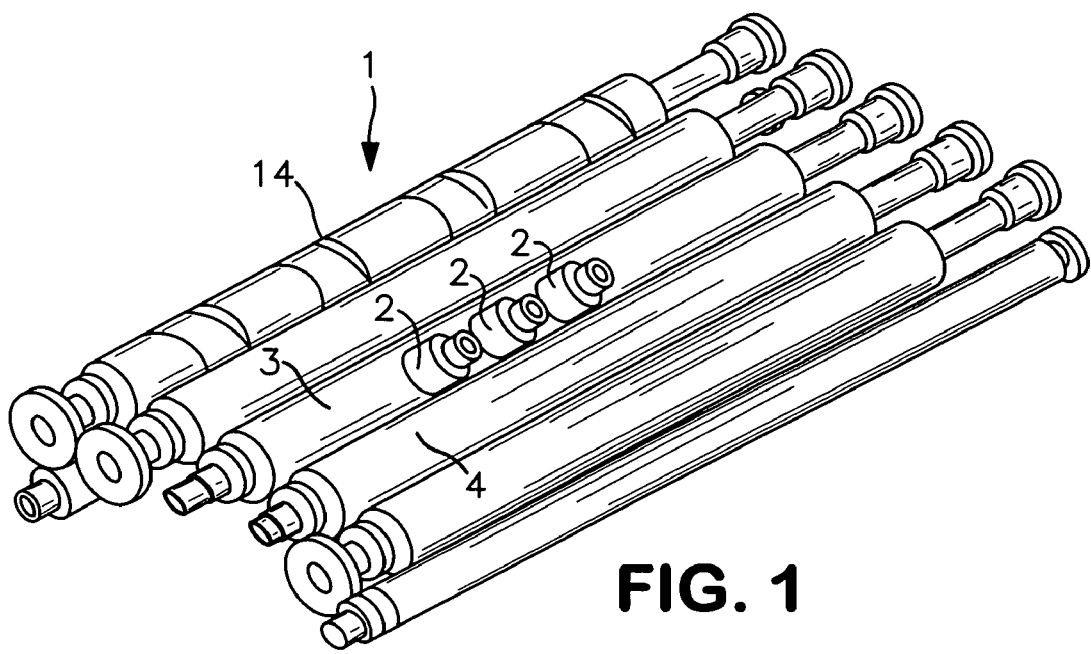
FIG. 1, is a schematic isometric view of a transport apparatus with a plurality of rotatable shafts and cylindrical containers that can be transported with it.
Figure 2:
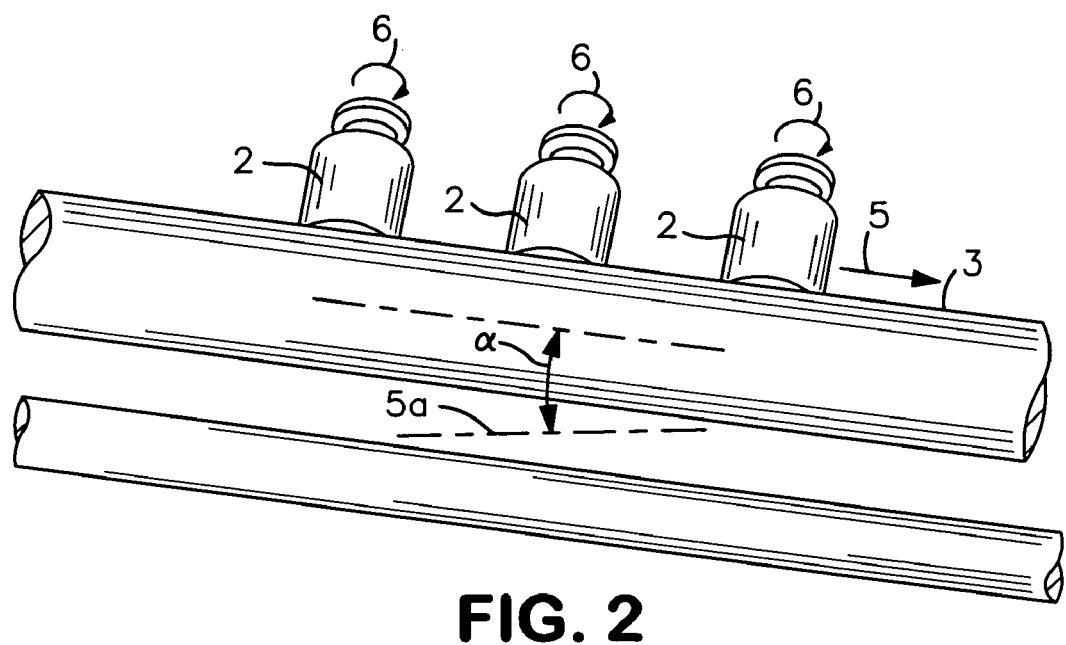
FIG. 2 is a detail showing two shafts, which are inclined in the transporting direction of the containers.

It can be seen from FIG. 2 that the shafts, and here it is the shaft 3 that is shown in particular, are inclined at an angle $\alpha$ to the transporting direction 5, and the containers 2 rotate as indicated by the arrow 6 during their motion in the transporting direction 5. From FIG. 3 it will now be explained how the geometric variables of the apparatus 1 and the containers 2 affect the transporting of the containers 2.

The decisive, determining factor for the angular position $\beta$ of the container 2 is the geometric position of its center of gravity 7. This center of gravity 7 depends substantially on the height and diameter of the container 2. As a function of the geometric data of the bearing system of the container 2, in this case the diameters 8 and 9 of the shafts 3 and 4 and/or their axial spacing 10, a center of gravity curve 11 is found for a variable angular position $\beta$.

With regard to an energy equilibrium consideration, the minimum requirement of this so-called spline function is the stable position of equilibrium of the container 2 in the bearing system of the shafts 3 and 4. The particular angular position $\beta$ of the container 2 can be varied in a stable way by means of a variation of the axial spacing 10 of the shaft bearings and/or the diameter 8 and/or 9 of the shafts 3 and 4.

Figure 4:
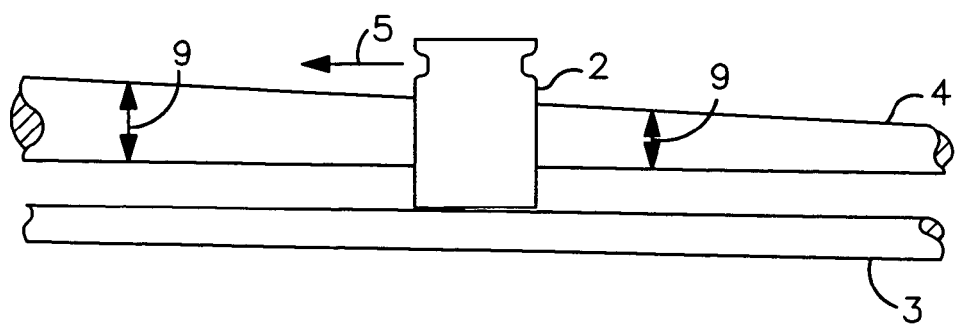
FIG. 4 is a view taken in the direction of arrow 13 in FIG. 3 showing the unilateral thickening of the shaft 4.

For instance, as shown in FIG. 4, by means of a unilateral thickening of the shaft 4, the container 2 can in principle be put into a nearly vertical position. In addition, by varying the axial spacing 10 of the bearings of the shafts 3 and 4, still other container diameters can be handled as well.

The invention can be employed in all machines that in processing do have to transport a cylindrical object linearly but might not have to position them in a targeted way, or even if a transitional transport route to a downstream machine has to be formed.

The foregoing relates to preferred exemplary embodiment of the invention, it being understood that other variants and embodiments thereof are possible within the spirit and scope of the invention, the latter being defined by the appended claims.

The invention claimed is:

1. In an apparatus for transporting cylindrical objects (2), in which only two generally parallel transporting shafts with plane surfaces (3, 4), rotatable in the same direction axially perpendicular to the transporting direction of the objects (2); and in which the objects (2) while being transported rest with their cylindrical wall on one shaft (4) and with a face end on a respective adjacent shaft (3); wherein the radial spacing (10) and diameters (8, 9) of the respective shafts (3, 4) cooperate to provide a predeterminable angular position ($\beta$), other than zero, of the objects (2) relative to the plane which contains the axes of the shafts (3, 4), and wherein the rotation of the shafts (3, 4) effect an intrinsic rotation (6) of the objects (2).

2. The apparatus of claim 1, wherein the shafts (3, 4) are inclined downwardly at a predetermined angle ($\alpha$) to the transporting direction (5).

3. The apparatus of claim 1, further comprising
a worm gear (11) applied to at least one shaft (3, 4) for adjusting the spacings of the transported cylindrical objects (2) during transport.

4. The apparatus of claim 2, further comprising
a worm gear (11) applied to at least one shaft (3, 4) for adjusting the spacings of the transported cylindrical objects (2) during transport.

5. The apparatus of claim 1, wherein
the respective radial spacing (10) and/or the respective diameters (8, 9) of the shafts (3, 4) is selected as a function of the geometrical dimensions of the cylindrical objects (2) by ascertaining the path (11) of the center of gravity as a function of the angular position ($\beta$) of the respective object (2).

6. The apparatus of claim 2, wherein
the respective radial spacing (10) and/or the respective diameters (8, 9) of the shafts (3, 4) is selected as a function of the geometrical dimensions of the cylindrical objects (2) by ascertaining the path (11) of the center of gravity as a function of the angular position ($\beta$) of the respective object (2).

7. The apparatus of claim 3, wherein
the respective radial spacing (10) and/or the respective diameters (8, 9) of the shafts (3, 4) is selected as a function of the geometrical dimensions of the cylindrical objects (2) by ascertaining the path (11) of the center of gravity as a function of the angular position ($\beta$) of the respective object (2).

8. The apparatus of claim 4, wherein
the respective radial spacing (10) and/or the respective diameters (8, 9) of the shafts (3, 4) is selected as a function of the geometrical dimensions of the cylindrical objects (2) by ascertaining the path (11) of the center of gravity as a function of the angular position ($\beta$) of the respective object (2).

9. The apparatus of claim 1, wherein the objects (2) are open-ended containers, and wherein the effect of the geometric design of the container open-end region as well as the diameter (12) and the length of the respective containers (2) are taken into account in determining the radial spacing (10) and the diameters of the shafts (3, 4).

10. The apparatus of claim 2, wherein the objects (2) are open-ended containers, and wherein the effect of the geometric design of the container open-end region as well as the diameter (12) and the length of the respective containers (2) are taken into account in determining the radial spacing (10) and the diameters of the shafts (3, 4).

11. The apparatus of claim 3, wherein the objects (2) are open-ended containers, and wherein the effect of the geometric design of the container open-end region as well as the diameter (12) and the length of the respective containers (2) are taken into account in determining the radial spacing (10) and the diameters of the shafts (3, 4).

12. The apparatus of claim 5, wherein the objects (2) are open-ended containers, and wherein the effect of the geometric design of the container open-end region as well as the diameter (12) and the length of the respective containers (2) are taken into account in determining the radial spacing (10) and the diameters of the shafts (3, 4).

13. The apparatus of claim 1, wherein the articles (2) are put into a substantially vertical position by a unilateral thickening of the shaft (4), on which the object (2) rests with its cylindrical wall.

14. The apparatus of claim 2, wherein the articles (2) are put into a substantially vertical position by a unilateral thickening of the shaft (4), on which the object (2) rests with its cylindrical wall.

15. The apparatus of claim 9, wherein the articles (2) are put into a substantially vertical position by a unilateral thickening of the shaft (4), on which the object (2) rests with its cylindrical wall.

16. The apparatus of claim 1, wherein the object is a fillable container (2).

17. The apparatus of claim 9, wherein the object is a fillable container (2).

18. The apparatus of claim 13, wherein the object is a fillable container (2).

19. The apparatus of claim 1, wherein the transport apparatus (1) is disposed in a nearly closed treatment chamber (20) for the objects (2).

20. The apparatus of claim 19, wherein a plasma source (30) for generating electromagnetic oscillations to sterilize the objects (2) is disposed in or on the treatment chamber (20).

* * * * *